2,833,625

STABILIZATION OF LIQUID SULFUR TRIOXIDE AND OLEUMS

Rudolph Pick, Elizabeth, N. J., assignor to E. I. du Pont de Nemours and Company, Wilmington, Del., a corporation of Delaware No Drawing. Application January 3, 1956
Serial No. 556,813

8 Claims. (Cl. 23—167)

This invention relates to liquid sulfur trioxide and high strength oleums that are stabilized against polymerization; and to the stabilization thereof employing as a polymerization inhibitor dimethyl sulfate in combination with silicon tetrachloride, tin tetrachloride, or a metal fluotitanate.

As is well known, sulfur trioxide exists in three forms having melting points of 17° C., 32.5° C. and 62° C. The polymeric form melting at 62° C., alpha $SO_3$, is the stable form under ordinary conditions. Upon freezing or even after standing at room temperature a short time the liquid gamma form (M. P. 17 C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases on the passage of time so that the ultimate mass will ordinarily contain solid forms of $SO_3$ in suspension in the oleum. This polymerization of sulfur trioxide in high strength oleums is also highly undesirable.

Various materials have been added to liquid sulfur trioxide to prevent the formation of the solid polymers. While these materials have effected stabilization of the liquid sulfur trioxide, in most instances their use was not completely satisfactory. For example, with many of the prior art stabilization inhibitors, a long heat treatment at elevated temperatures is required following the addition to the liquid sulfur trioxide of the inhibitor. Certain other additives cause the formation of a scum on the surface of the liquid sulfur trioxide.

I have discovered that liquid sulfur trioxide and oleum of $SO_3$ strength such that $SO_3$ polymers tend to form can be stabilized against the formation of alpha $SO_3$ polymers by incorporating therein a minor amount of dimethyl sulfate and a minor amount of a material selected from the group consisting of silicon tetrachloride, tin tetrachloride and metal salts of fluotitanic acid. No heat treatment is required after the addition of the combined stabilization inhibitor. The thusly stabilized liquid sulfur trioxide and high strength oleums do not polymerize to the high melting alpha form of $SO_3$ to any appreciable extent. They remain substantially in the liquid gamma form at room temperature and lower. After freezing by being cooled to a low temperature, they melt readily upon being reheated to room temperature. Therefore, these products can be used in commercial application directly without any remelting process whatsoever.

The relative amount of dimethyl sulfate and the above mentioned halogenides present in my stabilized compositions can vary widely. Thus the ratio of dimethyl sulfate to the halogenide can vary from about 0.1 to 10 parts by weight of dimethyl sulfate per part by weight of the halogenide. Ordinarily about equal weights of these materials are employed.

The total amount of the combined stabilization inhibitors to be incorporated into the $SO_3$ or oleum will vary with the use for which the $SO_3$-containing product is intended and with the conditions it will be expected to meet. The stabilizing influence of the combined inhibitors is proportional to the amount present. In general, it usually is desirable to use only sufficient amount to stabilize the product against substantial polymerization of $SO_3$, although relatively larger amounts of inhibitor can be used where the presence of an excess is not objectionable. In most instances it is desirable to use no more than about 10% combined weight of dimethyl sulfate plus halogenide, with from 0.2–5% based on the free $SO_3$ content being the preferred range. The higher percentages ordinarily are employed to stabilize the oleums.

The preferred compositions of this invention consist of liquid sulfur trioxide or oleum containing not more than about 0.1% of water, which materials are stabilized with from about 0.1 to 2.5% by weight of dimethyl sulfate and from about 0.1 to 2.5% by weight of silicon tetrachloride, tin tetrachlorode or a metal fluotitanate. Oleum containing not more than about 0.1% of water is, of course, oleum of $SO_3$ strength not less than about 99.4% and sulfuric acid content of not more than 0.56%. These materials high in sulfur trioxide can be stabilized readily so as to resist polymerization even after storage for long periods of time.

While metal salts of fluotitanic acid, that is metal fluotitanates, appear to be generally useful as the halogenide in my compositions, the alkali metal fluotitanates are the preferred fluotitanates because of their availability and ease of handling, coupled with their effective stabilizing properties. Of the aforementioned halogenide stabilization inhibitors, by far the best appears to be silicon tetrachloride. Compositions stabilized with a combination of dimethyl sulfate and silicon tetrachloride in about equal amounts appear to be completely stabilized against the formation of high melting polymers. Such compositions can be used for most conventional sulfonation reactions where liquid $SO_3$ is employed.

The stabilized $SO_3$ compositions of my invention can be prepared in any desired manner. Thus, the dimethyl sulfate and the halogenide can be added separately to the liquid sulfur trioxide. Alternatively, they can be mixed together to form a combined stabilizer which is subsequently mixed with the liquid sulfur trioxide. Still another way of preparing my compositions is to add to the liquid sulfur trioxide or oleum the desired amount of the halogenide and a material that will form dimethyl sulfate in situ, such as dimethyl ether. Still another way of preparing stabilized pure liquid sulfur trioxide is to condense $SO_3$ vapor in a closed vessel containing the desired amount of the stabilization inhibitors.

In order that the invention can be better understood, the following examples in addition to those set forth above are given:

*Example 1*

Anhydrous liquid gamma sulfur trioxide is mixed with agitation with 1% by weight of dimethyl sulfate and 1% by weight of silicon tetrachloride. This mixture is frozen for three days at 10° C., after which it remelts readily upon warming to room temperature. The composition was then refrozen four times; after each freezing it remelted completely upon warming to room temperature.

*Example 2*

Anhydrous liquid gamma sulfur trioxide is mixed with agitation with 0.5% by weight of potassium fluotitanate and 1% by weight of dimethyl sulfate. The resulting stabilized liquid $SO_3$ is frozen for one day by cooling to 10° C. Upon reheating to room temperature it remelts readily.

*Example 3*

Anhydrous liquid gamma sulfur trioxide is mixed with agitation with 0.25% by weight of stannic chloride and 1% by weight of dimethyl sulfate. The thusly prepared mixture is frozen for three days by cooling to 10° C. The frozen mixture remelts upon reheating to room temperature.

*Example 4*

Two percent by weight of dimethyl sulfate and 5% by weight of silicon tetrachloride are added with agitation to oleum of 99.5% $SO_3$ strength. After standing at room temperature for several days, the thusly stabilized oleum remains in the liquid form. After freezing by cooling to a low temperature, the oleum is found to remelt readily upon reheating to room temperature.

*Example 5*

Five percent by weight of sodium fluotitanate and 1% by weight of dimethyl sulfate is added with agitation to oleum of 99.7% $SO_3$ strength. Upon standing for 72 hours at room temperature, the thusly stabilized oleum remains in the solid state. After freezing by cooling to a low temperature, the oleum remelts readily upon reheating to room temperature.

I claim:

1. The method of stabilizing against $SO_3$ polymerization a compound selected from the group consisting of liquid sulfur trioxide and oleum of $SO_3$ strength such that $SO_3$ polymers tend to form comprising incorporating therein about 0.1 to 2.5% by weight of dimethyl sulfate and about 0.1 to 2.5% by weight of a material selected from the group consisting of silicon tetrachloride, tin tetrachloride and metal salts of fluotitanic acid.

2. The method in accordance with claim 1 wherein from about 0.2 to 5% combined weight of dimethyl sulfate and said material based on the free $SO_3$ content is incorporated.

3. The method of stabilizing liquid sulfur trioxide containing not more than 0.1% of water against $SO_3$ polymerization comprising incorporating therein about 0.1 to 2.5% by weight of dimethyl sulfate and about 0.1 to 2.5% by weight of a material selected from the group consisting of silicon tetrachloride, tin tetrachloride and metal salts of fluotitanic acid.

4. The method of stabilizing liquid sulfur trioxide against $SO_3$ polymerization comprising incorporating therein from about 0.2 to 5% combined weight of dimethyl sulfate and a material selected from the group consisting of silicon tetrachloride, tin tetrachloride and metal salts of fluotitanic acid.

5. A composition containing a material selected from the group consisting of liquid sulfur trioxide and oleum of $SO_3$ strength such that $SO_3$ polymers tend to form and, additionally, in an amount up to 10% combined weight based on $SO_3$ content, dimethyl sulfate plus a material selected from the group consisting of silicon tetrafluoride, tin tetrachloride and metal salts of fluotitanic acid.

6. A composition comprising a material from the group consisting of liquid sulfur trioxide and oleum $SO_3$ strength so that $SO_3$ polymers tend to form and, additionally, in an amount from 0.1 to 10% combined weight based on $SO_3$ content dimethyl sulfate plus a material selected from the group consisting of silicon tetrafluoride, tin tetrachloride and metal salts of fluotitanic acid.

7. A composition comprising liquid sulfur trioxide containing not more than 0.1% of water and about 0.2 to 5% combined weight of dimethyl sulfate and a material selected from the group consisting of silicon tetrafluoride, tin tetrachloride and metal salts of fluotitanic acid.

8. A composition comprising liquid sulfur trioxide containing not more than 0.1% of water, about 0.1 to 2.5% dimethyl sulfate, and about 0.1 to 2.5% of a material selected from the group consisting of silicon tetrachloride, tin tetrachloride and alkali metal salts of fluotitanic acid.

References Cited in the file of this patent

FOREIGN PATENTS

| | | |
|---|---|---|
| 1,065,022 | France | May 19, 1954 |
| 669,214 | Great Britain | Mar. 26, 1952 |